3,524,121
BATTERY CHARGING SYSTEMS FOR USE IN ROAD VEHICLES
Roger William Nolan, Redditch, and George Coleman, Sparkhill, Birmingham, England, assignors to Joseph Lucas (Industries) Limited, Birmingham, England, a British company
Filed June 20, 1968, Ser. No. 738,581
Claims priority, application Great Britain, July 14, 1967, 32,553/67
Int. Cl. H02j 7/04; G08b 21/00
U.S. Cl. 320—48                    1 Claim

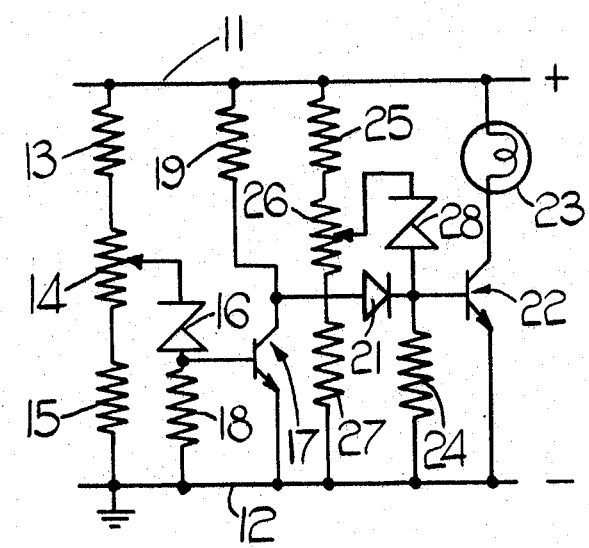

ABSTRACT OF THE DISCLOSURE

In a battery charging system for a road vehicle a generator charges the battery, and a semi-conductor device is provided which is biased to conduction and supplies current to a warning lamp. A first circuit turns the device off when the battery voltage attains a first predetermined value, and a second circuit turns the device on again when the battery voltage attains a second high predetermined value.

---

This invention relates to battery charging systems for road vehicles and has for its object to provide in such a system convenient means for indicating that the battery is being properly charged.

A battery charging system according to the invention comprises a generator for charging the battery, a semi-conductor device which is biased to conduction and supplies current to a warning lamp, a first circuit for turning the semi-conductor device off when the battery voltage attains a first predetermined value, and a second circuit for turning the semi-conductor device on again when the battery voltage attains a second higher predetermined value.

In use, the two predetermined values are chosen to be those within which the battery voltage should vary provided it is being properly charged. Thus, before the engine of a vehicle is started, the warning lamp will be illuminated, but as soon as the generator starts to charge the battery, the warning lamp will become extinguished. If for any reason the generator fails to charge the battery, the warning lamp will be illuminated again, and if the voltage regulator controlling the charging of the battery should fail, the battery voltage will increase and the warning lamp will again be illuminated to give the required warning.

The accompanying drawing is a circuit diagram illustrating one example of the invention.

Referring to the drawing, there are provided positive and negative supply lines 11, 12 between which the battery is connected, the battery being charged by a generator under the control of the vehicle ignition switch. The generator can be a dynamo, or an alternator and associated full wave rectifier.

Connected between the lines 11, 12 is a resistance chain 13, 14, 15, a variable point on the resistor 14 being connected through a Zener diode 16 to the base of an n-p-n transistor 17. The base of the transistor 17 is connected to the line 12 through a resistor 18, its emitter is connected through a Zener diode 16 to the base of an n-p-n line 11 through a resistor 19. The collector of the transistor 17 is further connected through a diode 21 to the base of a second n-p-n transistor 22 having its emitter connected to the line 12 and its collector connected to the line 11 through a warning lamp 23. The base of the transistor 22 is connected to the line 12 through a resistor 24.

Also connected between the lines 11, 12 is a resistance chain 25, 26, 27, and a variable point on the resistor 26 is connected through a Zener diode 28 to the base of the transistor 22.

In use, when the ignition switch is closed, but before the generator of the vehicle starts charging the battery, both Zener diodes 16, 28 are non-conductive and current flows through the resistor 19 and the diode 21 to the base-emitter circuit of the transistor 22 to turn it on, so that current flows in the warning lamp 23 to illuminate it. As soon as the engine has started, the voltage between the lines 11, 12 rises to a value such that the Zener diode 16 breaks down, and provides base current to the transistor 17, which therefore conducts to remove the base current from the transistor 22. The transistor 22 now turns off, and the warning lamp 23 is extinguished.

In the event that the voltage between the lines 11, 12 rises above a second and higher predetermined value, then the Zener diode 28 conducts, and provides base current to the transistor 22, so that the warning lamp 23 is again illuminated. At this stage both transistors 17, 22 are conducting, and the diode 21 prevents current flowing from the Zener diode 28 through the transistor 17.

The two values are chosen to be those between which the voltage of the battery varies in normal use, due consideration being given to the nature of the voltage regulator used. In a 12 volt system the voltages might, for example, be 13 volts and 14.5 volts. Thus, in normal operation the warning lamp 23 will be illuminated when the ignition switch is closed, but once the engine is running it will not be illuminated again. If at any time, however, the generator should fail to charge the battery for any reason, then the voltage between the lines 11, 12 will fall, the Zener diode 16 will cease to conduct and the transistor 17 will be turned off, so that the base current again flows in the transistor 22 and the warning lamp 23 is illuminated to indicate the fault. Likewise, if for any reason the voltage regulator should fail, the voltage between the lines 11, 12 tend to rise, and once again a warning will be given by the lamp 23.

Having thus described our invention what we claim as new, and desire to secure by Letters Patent is:

1. A battery charging system for a road vehicle, comprising a generator for charging the battery, a first transistor, a warning lamp connected in series with said first transistor, a biasing circuit connected to the base of said first transistor for turning said first transistor on to illuminate the warning lamp, a second transistor, means coupling said second transistor to the first transistor so that when the second transistor conducts it removes base current from the first transistor, a first Zener diode connected to the battery and adapted to conduit at a first predetermined battery voltage, means coupling the first Zener diode to the second transistor whereby when the battery voltage reaches said first predetermined value, the first Zener diode conducts and turns on the second transistor which in turn removes base current from the first transistor, a second Zener diode coupled to said battery and adapted to conduct when the battery voltage reaches a second higher predetermined value, means coupling said second Zener diode to the base of the first transistor whereby conduction of said second Zener diode provides base current to said first transistor to turn it on and illuminate the warning lamp, and a diode blocking the path between the second Zener diode and the second transistor.

References Cited

UNITED STATES PATENTS

| | | | |
|---|---|---|---|
| 2,817,830 | 12/1957 | Raver | 320—48 XR |
| 3,022,456 | 2/1962 | Larson et al. | 322—28 |
| 3,270,331 | 8/1966 | Kirk et al. | 320—48 XR |

WILLIAM M. SHOOP, Jr., Assistant Examiner

U.S. Cl. X.R.

340—249